US012512978B2

(12) United States Patent
Courtois et al.

(10) Patent No.: US 12,512,978 B2
(45) Date of Patent: Dec. 30, 2025

(54) AUDITABLE MASTER SECRETS AND KEY VAULT

(71) Applicant: QUALCOMM Incorporated, San Diego, CA (US)

(72) Inventors: Nicolas Thaddee Courtois, Mougins (FR); Jerome Perrine, Romanel sur Morges (CH); Denis Pochuev, Orinda, CA (US)

(73) Assignee: QUALCOMM Incorporated, San Diego, CA (US)

( * ) Notice: Subject to any disclaimer, the term of this patent is extended or adjusted under 35 U.S.C. 154(b) by 216 days.

(21) Appl. No.: 18/412,206

(22) Filed: Jan. 12, 2024

(65) Prior Publication Data

US 2025/0233739 A1   Jul. 17, 2025

(51) Int. Cl.
*H04L 9/08*  (2006.01)
*H04L 9/14*  (2006.01)
*H04L 9/30*  (2006.01)

(52) U.S. Cl.
CPC .............. *H04L 9/0869* (2013.01); *H04L 9/14* (2013.01); *H04L 9/3073* (2013.01)

(58) Field of Classification Search
CPC ........ H04L 9/0869; H04L 9/14; H04L 9/3073
See application file for complete search history.

(56) References Cited

U.S. PATENT DOCUMENTS

| 2018/0062835 A1* | 3/2018 | Hamel | H04L 9/0822 |
| 2018/0300717 A1* | 10/2018 | Haque | H04L 9/3213 |
| 2019/0213821 A1* | 7/2019 | Davis | H04L 9/3239 |
| 2019/0219391 A1* | 7/2019 | Haldenby | H04L 63/0823 |

* cited by examiner

*Primary Examiner* — Shanto Abedin

(74) *Attorney, Agent, or Firm* — Polsinelli

(57) ABSTRACT

Systems and techniques are provided for generating cryptographic keys. For instance, a process may include generating a plurality of master keys based on a plurality of generated random numbers, a second number, and a nonce number; storing a master key, of the plurality of master keys, along with a generated random number of the plurality of generated random numbers, the second number, and the nonce number used to generate the master key in a one-time programmable memory; generating public key-private key pairs for the plurality of master keys; transmitting public keys of the plurality of public key-private key pairs for audit; destroying an audited master key, along with the generated random number, second number, and the nonce number used to generate the audited master key, based on the audit; and storing a non-audited public key-private key pair corresponding to the master key that were not destroyed based on the audit.

19 Claims, 6 Drawing Sheets

AUDITABLE MASTER SECRETS AND KEY VAULT

FIELD

Aspects of the present disclosure generally relate to device security. For example, aspects of the present disclosure relate to establishing a system for auditable master secrets and key vault for devices.

INTRODUCTION

Computing devices typically store sensitive data owned by users or enterprises, with firmware or operating system software on the computing devices owned by a computing device or secure module manufacturer. To help secure computing devices, the firmware or software may include security measures to protect against, e.g., removing brute force attack mitigations, disabling secure boot, attacks against cryptographic keys, and/or attacks targeting random number generators (RNG). As an example, a processor or SoC may include a RoT, which may be used to centralize some security functionality and store important assets and information, such as cryptographic keys. The RoT may be hardened against threats and attacks and may be inherently trusted. In some cases, the ROT may be embedded hardware included in the SoC, such as a hardware based trusted platform module or trusted execution environment. To help enhance trust and encourage usage of such solutions, techniques to audit and certify cryptographic keys and/or random number sources for configuring security assets, and/or audit/certify the ROT may be useful.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

Disclosed are systems, methods, apparatuses, and computer-readable media for device security. According to at least one illustrative example, an electronic device is provided. The electronic device includes a one-time programmable memory; a memory system comprising instructions; and a processor system coupled to the memory system and the one-time programmable memory. The processor system is configured to: generate a plurality of master keys using a one-way function based on a plurality of generated random numbers, a second number, and a nonce number; store a master key, of the plurality of master keys, along with a generated random number of the plurality of generated random numbers, the second number, and the nonce number used to generate the master key in the one-time programmable memory; generate a plurality of public key-private key pairs for the plurality of master keys; transmit public keys of the plurality of public key-private key pairs for an audit; destroy an audited master key of the plurality of master keys, along with the generated random number, second number, and the nonce number used to generate the audited master key, based on the audit; and store a non-audited public key-private key pair corresponding to the master key that were not destroyed based on the audit.

In another example, a method for generating cryptographic keys is provided. The method includes: generating a plurality of master keys using a one-way function based on a plurality of generated random numbers, a second number, and a nonce number; storing a master key, of the plurality of master keys, along with a generated random number of the plurality of generated random numbers, the second number, and the nonce number used to generate the master key in a one-time programmable memory; generating a plurality of public key-private key pairs for the plurality of master keys; transmitting public keys of the plurality of public key-private key pairs for an audit; destroying an audited master key of the plurality of master keys, along with the generated random number, second number, and the nonce number used to generate the audited master key, based on the audit; and storing a non-audited public key-private key pair corresponding to the master key that were not destroyed based on the audit.

As another example, a non-transitory computer-readable storage medium having stored thereon instructions is provided. The instructions, when executed by one or more processors, cause the one or more processors to: generate a plurality of master keys using a one-way function based on a plurality of generated random numbers, a second number, and a nonce number; store a master key, of the plurality of master keys, along with a generated random number of the plurality of generated random numbers, the second number, and the nonce number used to generate the master key in the one-time programmable memory; generate a plurality of public key-private key pairs for the plurality of master keys; transmit public keys of the plurality of public key-private key pairs for an audit; destroy an audited master key of the plurality of master keys, along with the generated random number, second number, and the nonce number used to generate the audited master key, based on the audit; and store a non-audited public key-private key pair corresponding to the master key that were not destroyed based on the audit.

In another example, an apparatus for generating cryptographic keys is provided. The apparatus includes: means for generating a plurality of master keys using a one-way function based on a plurality of generated random numbers, a second number, and a nonce number; means for storing a master key, of the plurality of master keys, along with a generated random number of the plurality of generated random numbers, the second number, and the nonce number used to generate the master key in a one-time programmable memory; means for generating a plurality of public key-private key pairs for the plurality of master keys; means for transmitting public keys of the plurality of public key-private key pairs for an audit; means for destroying an audited master key of the plurality of master keys, along with the generated random number, second number, and the nonce number used to generate the audited master key, based on the audit; and means for storing a non-audited public key-private key pair corresponding to the master key that were not destroyed based on the audit.

As another example, an apparatus for auditing cryptographic numbers is provided. The apparatus includes: a memory system comprising instructions; and a processor system coupled to the memory system. The processor system is configured to: receive a plurality of public keys, the plurality of public keys corresponding to a plurality of master keys; select a public key of the plurality of public keys; obtain a master key, random number, second number, and nonce number corresponding to the selected public key; verify the public key based on the obtained master key, random number, second number, and nonce number; based on verification of the selected public key, sign a non-audited public key of the plurality of public keys; and deposit the signed non-audited public key on a public ledger.

In another example, a method for auditing cryptographic numbers is provided. The method includes: receiving a plurality of public keys, the plurality of public keys corresponding to a plurality of master keys; selecting a public key of the plurality of public keys; obtaining a master key, random number, second number, and nonce number corresponding to the selected public key; verifying the public key based on the obtained master key, random number, second number, and nonce number; based on verification of the selected public key, signing a non-audited public key of the plurality of public keys; and depositing the signed non-audited public key on a public ledger.

As another example, a non-transitory computer-readable storage medium having stored thereon instructions is provided. The instructions, when executed by one or more processors, cause the one or more processors to: receive a plurality of public keys, the plurality of public keys corresponding to a plurality of master keys; select a public key of the plurality of public keys; obtain a master key, random number, second number, and nonce number corresponding to the selected public key; verify the public key based on the obtained master key, random number, second number, and nonce number; based on verification of the selected public key, sign a non-audited public key of the plurality of public keys; and deposit the signed non-audited public key on a public ledger.

In another example, an apparatus for auditing cryptographic numbers is provided. The apparatus includes: means for receiving a plurality of public keys, the plurality of public keys corresponding to a plurality of master keys; means for selecting a public key of the plurality of public keys; means for obtaining a master key, random number, second number, and nonce number corresponding to the selected public key; means for verifying the public key based on the obtained master key, random number, second number, and nonce number; based on verification of the selected public key, signing a non-audited public key of the plurality of public keys; and means for depositing the signed non-audited public key on a public ledger.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip implementations (e.g., processors (such as CPU, GPU, DSP, NPU), memory or storage component(s), electronic blocks which ensure I/O connectivity and multimedia capabilities, and hardware modules associated with sensors or processing data from sensors, Image Signal Processors (ISPs), embedded discrete secure hardware modules, etc. or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

Other objects and advantages associated with the aspects disclosed herein will be apparent to those skilled in the art based on the accompanying drawings and detailed description. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and aspects, will become more apparent upon referring to the following specification, claims, and accompanying drawings.

BRIEF DESCRIPTION OF THE DRAWINGS

The accompanying drawings are presented to aid in the description of various aspects of the disclosure and are provided solely for illustration of the aspects and not limitation thereof.

DETAILED DESCRIPTION

Figure 1:
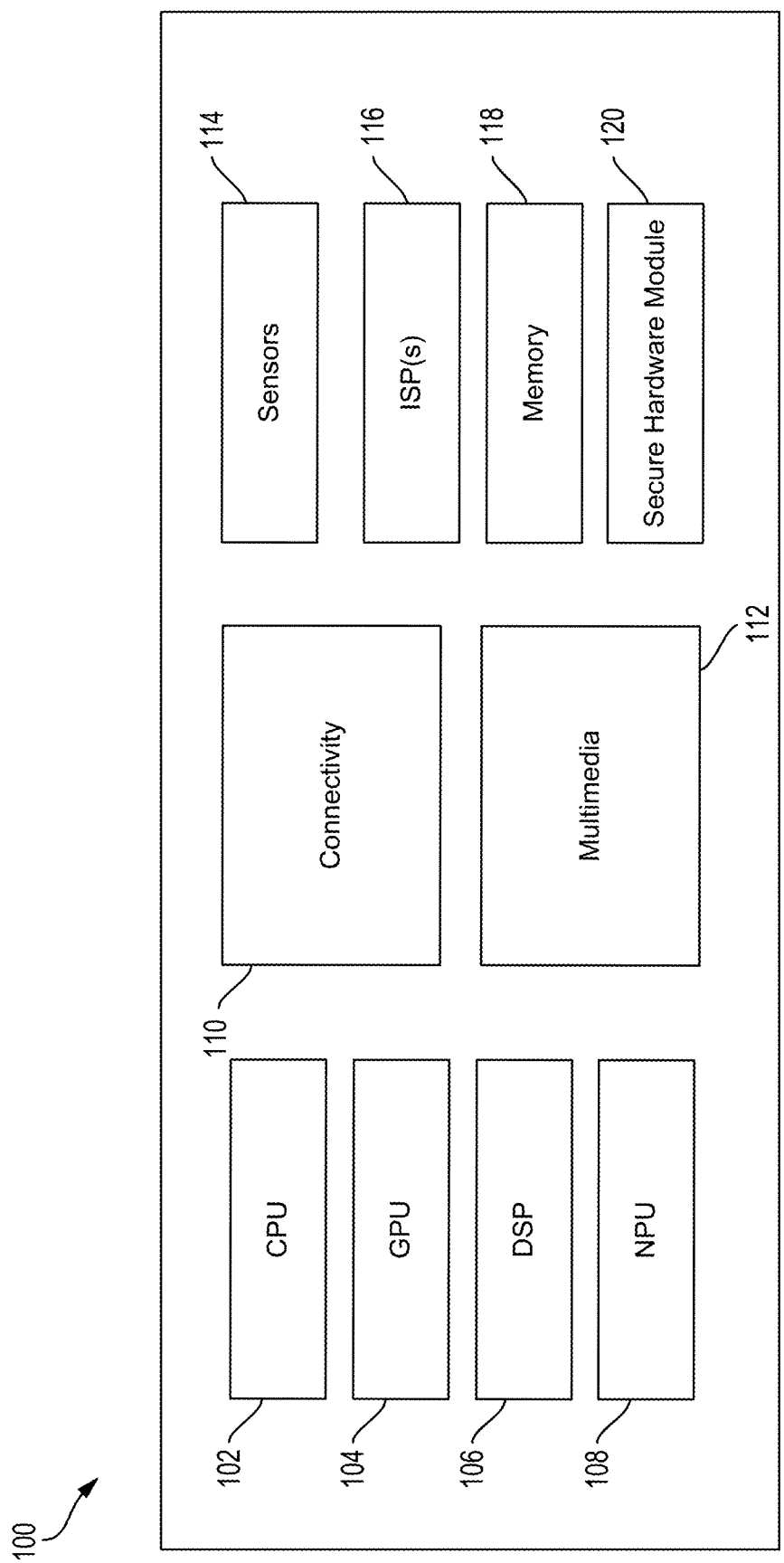
FIG. 1 illustrates an example implementation of a system-on-a-chip (SoC), in accordance with some examples.

Certain aspects of this disclosure are provided below for illustration purposes. Alternate aspects may be devised without departing from the scope of the disclosure. Additionally, well-known elements of the disclosure will not be described in detail or will be omitted so as not to obscure the relevant details of the disclosure. Some of the aspects described herein may be applied independently and some of them may be applied in combination as would be apparent to those of skill in the art. In the following description, for the purposes of explanation, specific details are set forth in order to provide a thorough understanding of aspects of the application. However, it will be apparent that various aspects may be practiced without these specific details. The figures and description are not intended to be restrictive.

The ensuing description provides example aspects only, and is not intended to limit the scope, applicability, or configuration of the disclosure. Rather, the ensuing description of the example aspects will provide those skilled in the art with an enabling description for implementing an example aspect. It should be understood that various changes may be made in the function and arrangement of elements without departing from the scope of the application as set forth in the appended claims.

Computing devices typically store sensitive data and privacy and/or security of this sensitive data is often ensured using cryptography. Additionally, digital currencies and/or digital tokens (e.g., cryptocurrencies) have emerged as active areas of interest. In some cases, it may be useful to provide an encryption/cryptography facilitator offering a high level of trust and audibility on a device/component of the device.

Systems, apparatuses, processes (also referred to as methods), and computer-readable media (collectively referred to as "systems and techniques") are described herein for generating cryptographic numbers or keys in a secure and auditable way. For example, a one way function, which may be a function that is relatively computational easy to compute, but computationally complex to invert, may be used to establish a set of master keys for a device. The master key may be a secret key, used to derive other keys in such a way that disclosure of any of the derived keys does not reveal any information about the master key itself (domain separation). The one way function may take information from multiple sources, such as from the device itself, from a public source, and from an organization involved in creating the device and/or a component of the device. The set of master keys may include a fixed set of master keys, such as 100 master keys. These master keys may be used to generate public key-private key pairs and the public keys of the key pair (e.g., 100 public keys) may be passed to the organization for auditing.

In some cases, the proper provisioning of the master keys may be auditable. Auditable may mean that a device may be able to verify the security of one or more master keys, and by extension, a key vault. To audit (e.g., to access and verify) the correct (e.g., in accordance with manufacturer assurances) generation of the public keys, the auditor may select a number of the public keys to be verified (e.g., to audit). Auditing a master key generation process can include determining a quality and security of the random number generation operation and output, which is used to generate master keys inside a key vault. It may be an iterative procedure aiming to detect malicious or misbehaving devices. In some examples, auditing may be based on a cut and choose principle whereby a device has a set of keys that may be audited and the auditing device (auditor) may choose which key(s) to audit. For example, an auditor can request an audited device to reveal the initial secrets used to generate the chosen master keys (e.g., as chosen (e.g., selected) by the auditor) so that it is unpredictable which master keys will be opened. When one of the master keys is audited, all the inputs used for the derivation of this master key (e.g., initial secrets) will be revealed to the auditor. The master keys which have been audited may be destroyed and may not be used further. The entropy used to deterministically derive each master key may come from multiple distinct sources.

As an example, 20 public keys may be selected for auditing. The device may then open the information used to create the selected public keys, such as the master key, and the information from multiple sources used to create the master key and pass this information to the organization. The device may then destroy the audited master keys. The organization may then recompute the selected public keys to verify that the selected public keys were properly created. If the selected public keys were properly created, the organization may sign the remaining public keys (e.g., the non-audited public keys) and the organization may deposit the non-audited public keys on a public ledger.

Various aspects of the present disclosure will be described with respect to the figures.

As used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently.

The term "mobile device" is used herein to refer to any one or all of cellular telephones, smartphones, Internet-of-things (IoT) devices, personal or mobile multimedia players, laptop computers, tablet computers, ultrabooks, palm-top computers, wireless electronic mail receivers, multimedia Internet enabled cellular telephones, wireless gaming controllers, smart cars, autonomous vehicles, and similar electronic devices which include a programmable processor, a memory and circuitry for sending and/or receiving wireless communication signals to/from wireless communication networks. While the various embodiments are particularly useful in mobile devices, such as smartphones and tablets, the embodiments are generally useful in any electronic device that includes secure boot circuitry for securing access to the electronic device.

Various aspects of the techniques described herein will be discussed below with respect to the figures. FIG. 1. FIG. 1 illustrates an example implementation of a system-on-a-chip (SoC) 100, which may include a central processing unit (CPU) 102 or a multi-core CPU, configured to perform one or more of the functions described herein. Parameters or variables (e.g., neural signals and synaptic weights), system parameters associated with a computational device (e.g., neural network with weights), delays, frequency bin information, task information, among other information may be stored in a memory block associated with a neural processing unit (NPU) 108, in a memory block associated with a CPU 102, in a memory block associated with a graphics processing unit (GPU) 104, in a memory block associated with a digital signal processor (DSP) 106, in a memory block 118, and/or may be distributed across multiple blocks. Instructions executed at the CPU 102 may be loaded from a program memory associated with the CPU 102 or may be loaded from a memory block 118.

In some cases, the SoC 100 may be based on an ARM instruction set. The SoC 100 may also include additional processing blocks tailored to specific functions, such as a GPU 104, a DSP 106, a connectivity block 110, which may include fifth generation (5G) connectivity, fourth generation long term evolution (4G LTE) connectivity, Wi-Fi connectivity, USB connectivity, Bluetooth connectivity, and the like, and a multimedia processor 112 that may, for example, detect and recognize gestures. In one implementation, the NPU is implemented in the CPU 102, DSP 106, and/or GPU 104. The SoC 100 may also include a sensor processor 114, image signal processors (ISPs) 116, and/or a secure hardware module 120.

The secure hardware module 120 may include fuses, replay protected memory block (RPMB), secure bits, secure flags, security enabled hardware, secure memory, or hardware, software, or firmware used to implement a secure portion of the operating system, a secure operating system (SOS), a trusted execution environment (TEE), trusted platform module (TPM), etc. The secure hardware module 120 may be used to process and/or store sensitive data in an environment that is segregated from the rich execution environment in which the operating system and/or applications may be executed. The secure hardware module 120 can be configured to execute trusted applications that provide end-to-end security for sensitive data by enforcing confidentiality, integrity, and protection of the sensitive data stored therein. The secure hardware module 120 can be used to store encryption keys, access tokens, and other sensitive data. In some cases, the secure hardware module 120 may serve as a RoT for the SoC 100. For example, the secure hardware module 120 may provide for the secure generation of cryptographic keys, limitations on the use of such cryptographic keys, and may contain one or more cryptographic keys or elements that may be used to authenticate the SoC 100. In some cases, the RoT may serve to anchor a chain of trust to validate other hardware and/or software. In some cases, the secure hardware module 120 may be implemented as a secure area of the CPU 102, as a part of the SoC 100, or any combination thereof.

Figure 2:
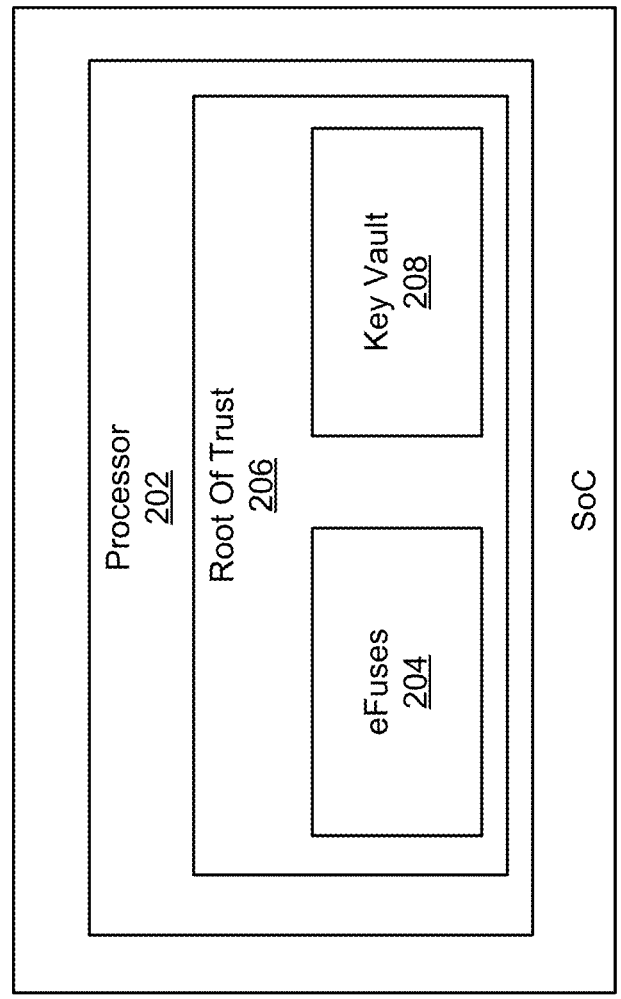
FIG. 2 is a block diagram illustrating an example general security architecture of a SoC, in accordance with aspects of the present disclosure.

FIG. 2 is a block diagram of an SoC 200, in accordance with aspects of the present disclosure. The SoC 200 includes a processor 202 (e.g., core, chiplet, etc.) and the processor 202 includes a root of trust 206 (ROT 206). The RoT 206 includes a key vault 208 and a set of eFuses 204. The set of eFuses 204 includes a plurality of eFuses, which are hardware embedded one-time programmable bits (e.g., fuses) that once "blown" cannot be readily reverted to an "unblown" state. Generally, the eFuses may be blown by an original equipment manufacturer (OEM) and/or original design manufacturer (ODM) as a part of a manufacturing process (e.g., during configuration, testing, etc.) and/or by the processor 202 during operations, but once blown, an eFuse cannot be readily reverted. The set of eFuses 204 may be considered a type of ROM. In some cases, other types of ROM or one-time programmable memory (e.g., write once memory) may be used in place of eFuses. The set of eFuses 204 may be only accessible though the RoT 206 (e.g., by applications running inside the RoT 206).

The RoT 206 may be used to verify the security and debug states of the processor 202 and/or SoC 200 and the RoT may establish a security boundary (e.g., secure enclave) for the processor 202 and/or SoC 200. The security boundary may refer to hardware and/or software that forms a trusted zone or boundary and provides the basis for performing security services.

The key vault 208 may be a logical space within the RoT 206 that may be used to perform operations on a stored set of cryptographic keys. An example of a key vault is a wallet. Keys of the stored set of cryptographic keys may be generated as a part of key generation process during provisioning of the SoC 200, for example, during manufacturing of the SoC 200 and stored in the set of eFuses 204. The key vault 208 may access these stored keys to perform cryptographic operations, such as signing, generating public keys, auditing, etc. While the SoC 200 includes a single processor 202, it should be understood that the SoC 200 may include any number of processors.

Figure 3:
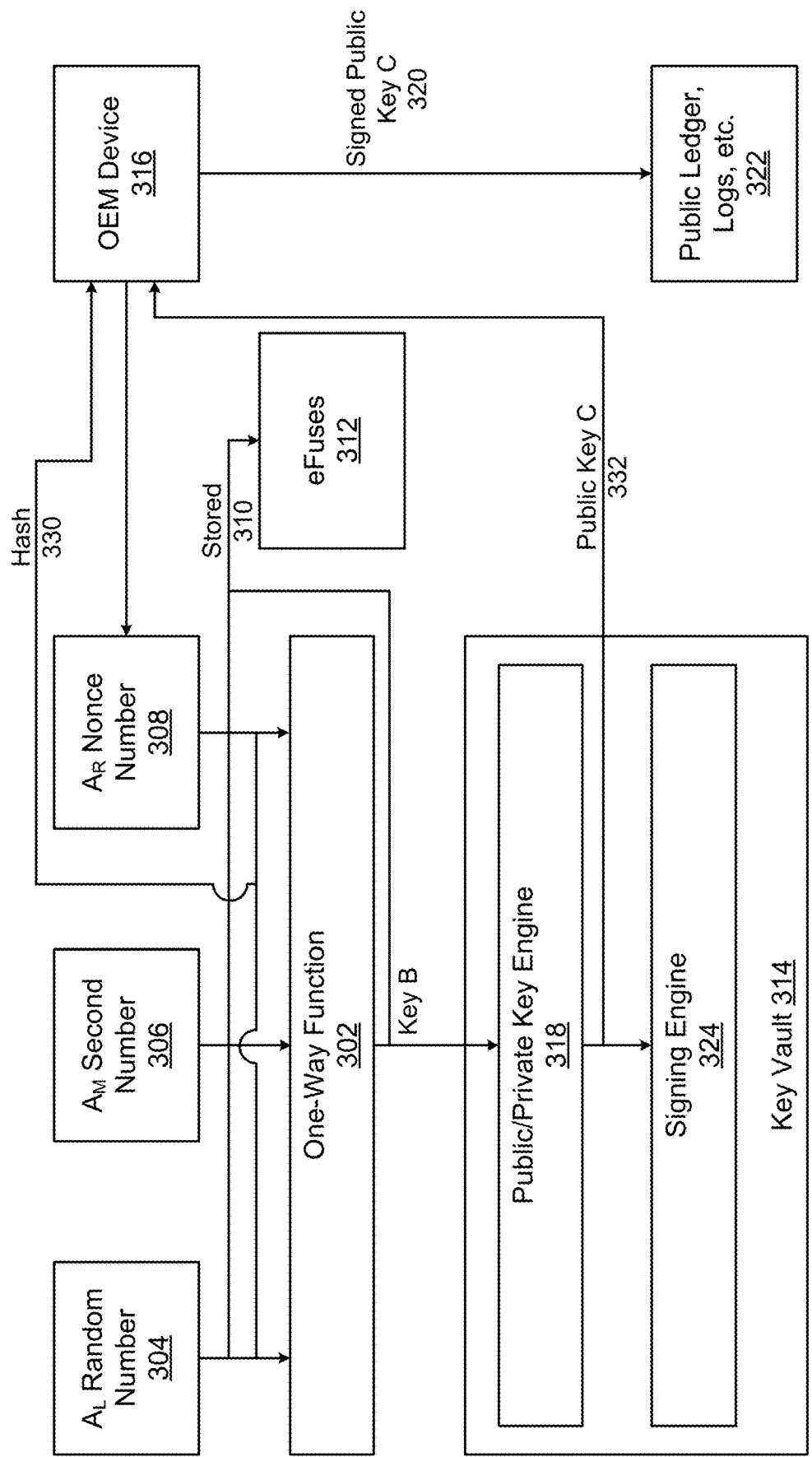
FIG. 3 is a logical block diagram illustrating a technique for generating auditable master secrets and unique key vault, in accordance with aspects of the present disclosure.

FIG. 3 is a logical block diagram illustrating a technique 300 for generating auditable master secrets and key vault, in accordance with aspects of the present disclosure. In some cases, one or more one-way functions may be used to generate random numbers that may be used as a key for cryptographic operations. For example, a first one-way function 302 may accept multiple inputs, such as three inputs, and generate an output a master key B. As shown in FIG. 3, the first one-way function 302 may accept a random number $A_L$. 304, a second number $A_M$ 306, and a nonce number $A_R$ 308, and generate a set of master keys B. The set of master keys B may be stored 310 in a set of eFuses 312 along with the random number $A_L$. 304, second number $A_M$ 306, and nonce number $A_R$ 308 used to generate a corresponding master key B. A limited number of master keys may be generated. For example, 100 master keys B may be generated. Each master key B is generated using a different combination of the random number $A_L$ 304, second number $A_M$ 306, and nonce number $A_R$ 308. For example, a different random number $A_L$. 304 may be used for each master key B. The random number $A_L$. 304 may be a pseudo-random number or a random number. For example, a random number may be generated based on a hardware circuit which may generate random numbers based on a physical process which is known to have statistically random noise (e.g., entropy). The pseudo-random number may be generated by an algorithm, implemented either in hardware or software, for generating a sequence of numbers which approximate random numbers. Output of a pseudo-random number generator may appear random (e.g., statistically), but the output of the pseudo-random number generator may be determined by an initial seed value. The nonce number $A_R$ 308 may be a random or pseudo-random number that may be provided by a designer, OEM, and/or manufacturer. For a cryptographic protocol, the nonce number should be used once.

The second number $A_M$ 306 and nonce number $A_R$ 308 may be the same for each master key B of the set of master keys, or a different second number $A_M$ 306 and/or nonce number $A_R$ 308 may be used for each master key B of the set of master keys. In some cases, the master keys may be output, for example, for backup by printing the master keys. For example, one or more of the master keys may be converted into a number of words for printing as a hard-copy backup.

In some cases, each number (e.g., random number $A_L$, 304, second number $A_M$ 306, and nonce number $A_R$ 308) used to generate a master key B may originate from a different source. For example, the random number $A_L$. 304 may be generated by the RoT (e.g., RoT 206) of the device. In some cases, the key vault 314 may generate random number $A_L$ 304. Optionally, the random number $A_L$ 304 may be prepended (or postpended) with a unique identifier, which may allow for traceability and the unique identifier may be opt-in (e.g., set unique identifier to all 0/1 or length 0). The unique identifier may not be stored, for example, by a designer, OEM, and/or manufacturer outside of the device/ROT absent regulations. The unique identifier may be a per device unique identifier (e.g., unique to a specific device). As the random number $A_L$ 304 is generated and stored by the ROT and may not be provided to other parties (including the designer/OEM/manufacturer) except during an audit process, the random number $A_L$ 304 acts as a master secret that is private to the ROT to secure each master key B. In some cases, the manufacturer may be an entity which manufactures, and/or assembles the SoC/ROT, the OEM may be an entity which incorporates the SoC into a product (e.g., device, device component, etc.), and the designer may be an entity which develops the SoC/ROT.

The second number $A_M$ 306 may be a semi-random and/or public number. For example, the second number $A_M$ 306 may be a hash of a public random number (e.g., random or pseudo-random number obtained from a public source) such as a block number of a blockchain like Ethereum, a block from RANDAO, a number from a multi-party random number protocol, or other public source of numbers. In some cases, a different second number $A_M$ 306 may be used for each master key B. The second number $A_M$ 306, in some cases, may be provided by the designer/OEM/manufacturer, e.g., by the device 316.

The nonce number $A_R$ 308 may be a number provided by the device 316 of the designer/OEM/manufacturer. In some cases, the nonce number $A_R$ 308 may be provided along with the second number A 306. The nonce number $A_R$ 308 may be provided as a part of a provisioning process for the RoT/device. In some cases, a different nonce number $A_R$ 308 may be used for each master key B. In some cases, the OEM/manufacturer may act as an intermediary for provisioning the SoC. For example, the nonce number $A_R$ 308 may be provided, for example, by a designer of the SoC/ROT to the OEM/manufacturer of the device that includes the SoC/ROT (e.g., via a secure server (not shown) to the device 316) and the OEM/manufacturer may pass the nonce number $A_R$ 308 to the RoT. The OEM/manufacturer may forward responses and/or messages (e.g., as discussed below) from the RoT to the designer.

After receiving the nonce number $A_R$ 308, the ROT and/or key vault 314 may commit to the nonce number $A_R$ 308 by hashing the random number $A_L$ 304 and the nonce number $A_R$ 308 and providing the hashed number 330 to the designer/OEM/Manufacturer, such as the device 316 or a secure server. By having the RoT/key vault 314 provide the hashed number 330 to the designer/OEM/Manufacturer based on the nonce number $A_R$ 308, the designer/OEM/Manufacturer becomes the last actor (e.g., providing the nonce number $A_R$ 308), and helps prevent the RoT/key vault 314 (e.g., a hacked/infected version of the RoT/key vault 314) from cooking the random number (e.g., swapping the random number $A_L$ 304 to a number known/predictable by an attacker). The ROT and/or key vault 314 may commit to the nonce number $A_R$ 308 for each master key B generated. Additionally, the hashed number 330 may be used to help audit the key vault 314.

As indicated above, based on the random number $A_L$ 304, second number $A_M$ 306, and nonce number $A_R$ 308, the one-way function 302 may generate a set of master keys. Examples of the one-way function 302 may include a Keccak or Ascon based hash function. The set of master keys may be passed to a public/private key engine 318. The public/private key engine 318 may generate private and public key pairs based on the master keys. For example, the public/private key engine 318 may generate a private key/public key pair for each master key B of the set of master keys. In some cases, the public/private key engine 318 may use a blockchain private/public key based protocol, such as a Bitcoin improvement proposal 32 (BIP32) function. As an example, the public/private key engine 318 may use BIP32 to generate a public key C 332 as a part of a public key-private key pair. This public key C 332 may be passed to the designer/OEM/manufacturer (e.g., to device 316) as a part of an audit process.

As indicated above, a public key C 332 may be passed for each master key B in the set of master keys. Thus, if 100 master keys were generated, 100 public keys may be passed to device 316. Of this set of public keys, the designer/OEM/manufacturer may select a number of public keys to audit. Auditing may be performed based on a cut and choose fairness philosophy where one party cuts a cake (e.g., creates the public keys), while another party chooses the slice of cake (e.g., chooses which public key to audit). In some cases, the number of public keys selected for auditing may be a representative sample selected randomly by the designer/OEM/manufacture from the set of public keys. For example, 30 public keys may be randomly selected for auditing.

In some cases, an indication of which public keys were selected for auditing may be passed to the key vault 314. Audited keys may (or should) be destroyed or disabled to maintain security. For example, when audited, the key vault 314 may destroy the master key B stored in the set of eFuses 312 corresponding to the audited public key (or not store the master key B in the set of eFuses 312). The master key B may be destroyed along with the corresponding random number $A_L$. 304, a second number $A_M$ 306, and a nonce number $A_R$ 308 used to generate the master key B stored in the set of eFuses 312. In some cases, destroying and/or disabling the stored values may be performed based on properties of the memory storing the values. For example, destroying and/or disabling the stored values may take advantage of the one-time programmability of memory such as eFuses where bits, once, written, cannot be unwritten. In some cases, destroying the stored values in the set of eFuses 312 may be performed by blowing at least one additional eFuse (or all eFuses) representing the value (e.g., master key B, random number $A_L$. 304, second number A 306, and nonce number $A_R$ 308) to be destroyed. Additionally, any remaining residual copy, cached values in RAM, caches, registers, flip-flops, FIFOs, etc. may be overwritten, erased, and/or otherwise destroyed. In some cases, all of the eFuses 312 corresponding to the value to be destroyed may be blown. In some cases, it may be useful to not destroy audited keys, for example, to allow for a secondary audit, to allow for backups to be created, when the audit is performed under certain security conditions, etc., but allowing for non-destructive audits may erode trust in the security of the key vault. Audits during manufacturing should be destructive.

If the audit determines that all of the audited public keys were correctly created, the designer/OEM/manufacturer may sign the remaining public keys (e.g., 70 public keys) using a digital signature of the designer/OEM/manufacturer as being an audited key vault 314. In some cases, the designer/OEM/manufacturer may record the signed public keys 320 in a public ledger 322, such as an Ethereum ledger, certifying that the remaining public keys are presumably secure. Recording the signed public keys 320 in a public ledger 322 may also certify that the device is a legitimate/genuine device from the stated manufacturer. The evidence of the audit indicates that the device comes from a batch of devices manufactured at a point in time and that the device is in compliance with a certain set of quality and/or security checks according to the manufacturer practices, applicable laws and/or regulatory requirements. A public ledger may be a record of information that may be broadly accessed (e.g., by the public). Signing all of the public keys and placing them on a public ledger helps provide broad auditability for the key vault 314. For example, where public key C is created using BIP32, the public key C may be a function of the private key corresponding to the public key C transformed into a public key using a base point on an elliptic curve compatible with a public ledger 322, such as the Ethereum ledger, and the public key C may be a semi-public root validator which in an indirect incomplete or hashed form may be known or embedded inside a first standardized deposit address (e.g., first Ethereum deposit address) for the signed public key 320. The designer/OEM/manufacturer (e.g., device 316) may return an indication to the RoT/key vault 314 that the audit was completed successfully.

In some cases, the manufacturer/OEM may deposit production metadata along with the signed public keys 320 in the public ledger. For example, production metadata may also be deposited in the public ledger. In some cases, the production metadata may detail/attest to actions/events that were performed during the manufacturing and/or manufacturer auditing process. The production metadata may include a timestamp indicating a production date/time, batch number, position of a processor in a wafer, extra digital signatures, manufacturing/message authentication codes, and the like.

Based on an indication that the non-audited public keys have been successfully audited, the remaining public keys and corresponding private keys may be stored, for example, in the RoT and/or key vault 31. The non-audited public key-private key pairs may be used as a standard cryptographic key pair. For example, a public/private key pair may be used for signing (e.g., by a signing engine 324), sign/certify deposit addresses for ledgers, derive additional public/private keys, etc. In some cases, a first private key (e.g., lowest numbered private key) of the remaining private keys (and corresponding public key C) may be kept internal and private to the key vault 314. The public key C corresponding to the first private key may be blocked from being used, for example, for signing or for other purposes that may result in falsifying internal and/or external financial records or activity logs. In some cases, usage of the first private key may be reserved to internal key vault functions or/and production of metadata the existence of which the user might ignore, and/or self-signing other public keys and/or deposit addresses. In some cases, if a user, owner, and/or application invokes the first private key, operations by the key value may be limited to signing basic well formed transactions, such as enabling or transferring control and/or assets to another private key within the wallet, and the ability to sign arbitrary binary data or messages using the first private key (e.g., beginning private key) may be limited. This limitation may be enforced by ROM and/or hardware security mechanisms and checks and this limitation is intended to prevent arbitrary use of this first key pair to sign arbitrary data or messages which might imitate genuine actions of the wallet, misrepresent the history of events related to assets stored on a given key vault, and/or alter/modify the flow of actions, authorizations, and/or events which may not have been authorized by this specific vault using the first root private key specifically. In some cases, the first deposit address may be used to sign/certify another deposit address. In some cases, the key vault 314 may include a built-in functionality to self-certify additional public ledger addresses (e.g., Ethereum public keys and Ethereum addresses) using messages and/or certificates signed using a private key corresponding with a public key C.

During an audit process, all of the inputs to the one-way function 302 (e.g., the random number $A_L$. 304, second number $A_M$ 306, and nonce number $A_R$ 308) may be revealed by the key vault 314 and passed to the auditing party, such as the designer/OEM/manufacturer (e.g., device 316). In some cases, the auditing party may calculate a hashed check number based on the random number $A_L$ 304 and the nonce number $A_R$ 308 and verify (e.g., compare, match, etc.) the hashed check number against the hashed number 330 provided to the designer/OEM/manufacturer. In some cases, the auditing party may calculate the master key B (e.g., check master key) for the key pair being audited based on the inputs to the one-way function 302 and from the master key B, derive a check public key C. The check public key C may be verified (e.g., matched) against the public key C 332 passed to the designer/OEM/manufacturer or stored on the public ledger 322. In cases where the random number $A_L$. 304 includes a device unique identifier, the auditing party may verify that the same device unique identifier is included with the random number $A_L$. 304 for each audited key. In some cases, any authorized application executing on the device with access to the key vault 314 may perform an audit. In some cases, consent of a user of the device (e.g., device including a SoC with a key vault 314) may have to authorize any audits (except audits performed as part of provisioning the SoC and/or device). In some cases, the ability to perform audits may be based on a system permission or security authorization and the ability to perform audits may be limited to certain applications and/or controlled by operating system permissions and/or user preferences.

Figure 4:
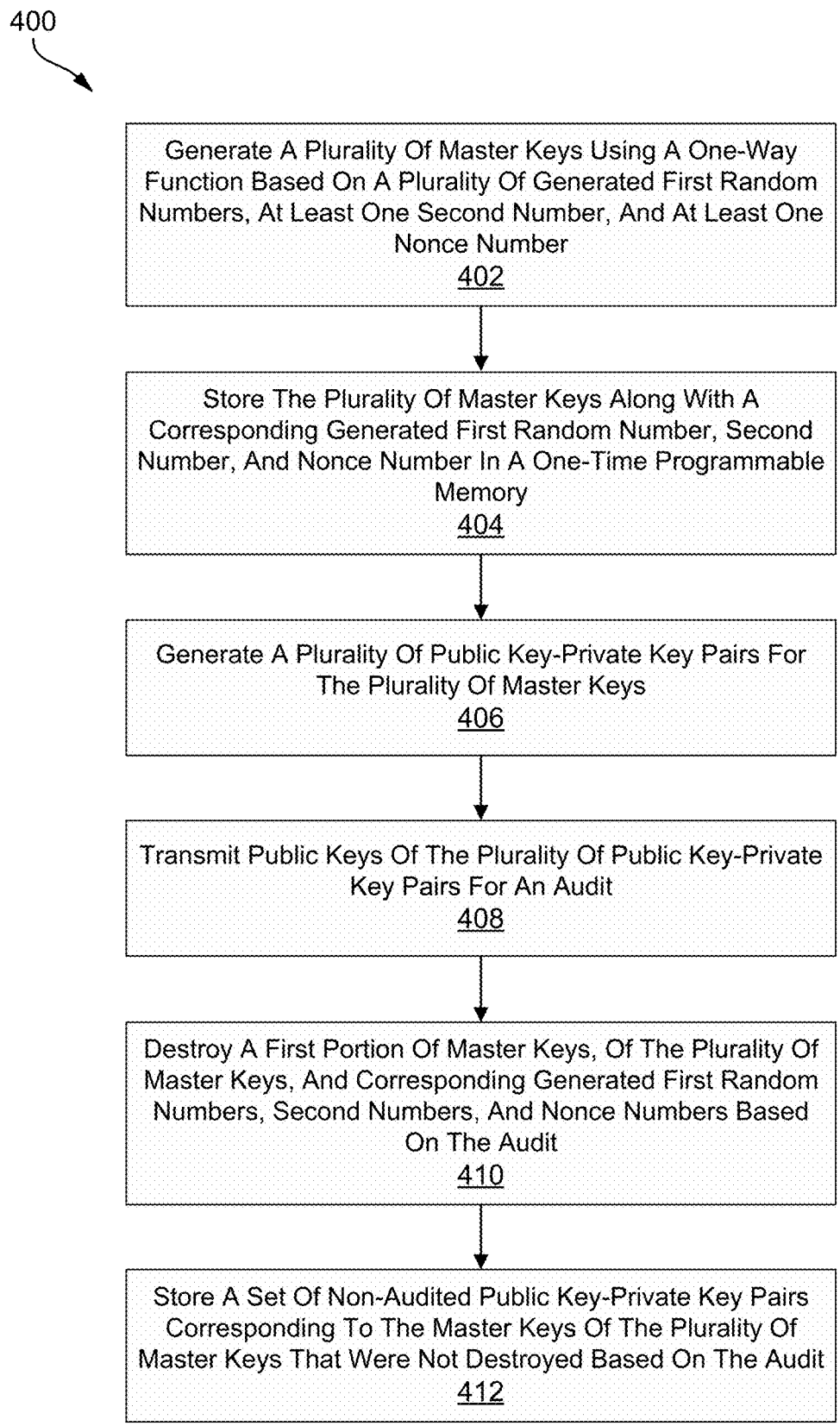
FIG. 4 is a flow diagram illustrating an example of a process for generating cryptographic numbers, in accordance with aspects of the present disclosure.

FIG. 4 is a flow diagram illustrating an example of a process 400 for generating cryptographic numbers, in accordance with aspects of the present disclosure. The process 500 may be performed by a wireless device or by a component (e.g., SoC 100 of FIG. 1, SoC 200 of FIG. 2, processor 202 of FIG. 2, root of trust 206 of FIG. 2, processor 610 of FIG. 6, etc.) or system (e.g., a chipset) of the wireless device (e.g., computing system 600). The electronic device may be a wireless device, such as computing system 600, or a UE (e.g., a mobile device such as a mobile phone, a network-connected wearable such as a watch, an extended reality device such as a virtual reality (VR) device or augmented reality (AR) device, a vehicle or component or system of a vehicle, or other type of UE) or other type of network node. In some examples, the process 400 may be performed by a UE. The operations of the process 400 may be implemented, in part, as software components that are executed and run on one or more processors (e.g., CPU 102 of FIG. 1, processor 202 of FIG. 2, processor 610 of FIG. 6, or other processor(s)).

At block 402, the computing device (or component thereof) may generate a plurality of master keys using a one-way function (e.g., first one-way function 302 of FIG. 3) based on a plurality of generated random numbers (e.g., random number $A_L$ 304 of FIG. 3), a second number (e.g., second number $A_M$ 306), and a nonce number (e.g., nonce number $A_R$ 308). In some cases, the computing device (or component thereof) may receive the second number and nonce number during a manufacturing process, wherein the second number comprises a number obtained from a public source. In some examples, each master key of the plurality of master keys is generated based on a unique generated random number. In some cases, each master key of the plurality of master keys is generated based on a unique second number and a unique nonce number. In some example, the computing device (or component thereof) may generate a hash number based on the generated random number and the nonce number; and provide the hash number to a manufacturer, designer, or original equipment manufacturer. In some cases, the random number includes a device unique identifier.

At block 404, the computing device (or component thereof) may store a master key, of the plurality of master keys, along with a generated random number of the plurality of generated random numbers, the second number, and the nonce number used to generate the master key in the one-time programmable memory (e.g., eFuses 204 of FIG. 2, eFuses 312 of FIG. 3).

At block 406, the computing device (or component thereof) may generate a plurality of public key-private key pairs (e.g., by a a public/private key engine 318) for the plurality of master keys. In some cases, the computing device (or component thereof) may store the generated random number, second number, and nonce number used to generate the audited master key, and the audited master key in the one-time programmable memory; receive an indication that a public key generated based on the audited master key of the plurality of public key-private key pairs is being audited; provide the generated random number, second number, and nonce number used to generate the audited master key, and the audited master key associated with the public key; and destroy the generated random number, second number, and nonce number used to generate the audited master key, and the audited master key associated with the public key stored in the one-time programmable memory. In some examples, the computing device (or component thereof may) destroy the generated random number, second number, and nonce number, and master key, by writing at least one bit for each portion of the one-time programmable memory storing the generated random number, second number, and nonce number, and master key. In some cases, the plurality of public key-private key pairs are generated based on a Bitcoin improvement proposal 32 (BIP32) function.

At block 408, the computing device (or component thereof) may transmit public keys of the plurality of public key-private key pairs for an audit (e.g., public key C 332 of FIG. 3).

At block 410, the computing device (or component thereof) may destroy an audited master key of the plurality of master keys, along with the generated random number, second number, and the nonce number used to generate the audited master key, based on the audit. For example, an indication of which public keys were selected for auditing may be passed to the key vault and the audited keys may (should) be destroyed or disabled to maintain security. In some cases, a representative sample of the plurality of master keys are audited.

At block 412, the computing device (or component thereof) may store a non-audited public key-private key pair corresponding to the master key that were not destroyed based on the audit (e.g., in eFuses 204 of FIG. 2, eFuses 312 of FIG. 3, key vault 208 of FIG. 2, etc.). In some cases, a public key of the non-audited public key-private key pair is deposited on a public ledger (e.g., public ledger 322 of FIG. 3). In some examples, the public key of the non-audited public key-private key pair is deposited on a public ledger at an address based on the public key. In some cases, a public key of the non-audited public key-private key pair is signed by a manufacturer, designer, or original equipment manufacturer. For example, if the audit determines that all of the audited public keys were correctly created, the designer/OEM/manufacturer may sign the remaining public keys.

Figure 5:
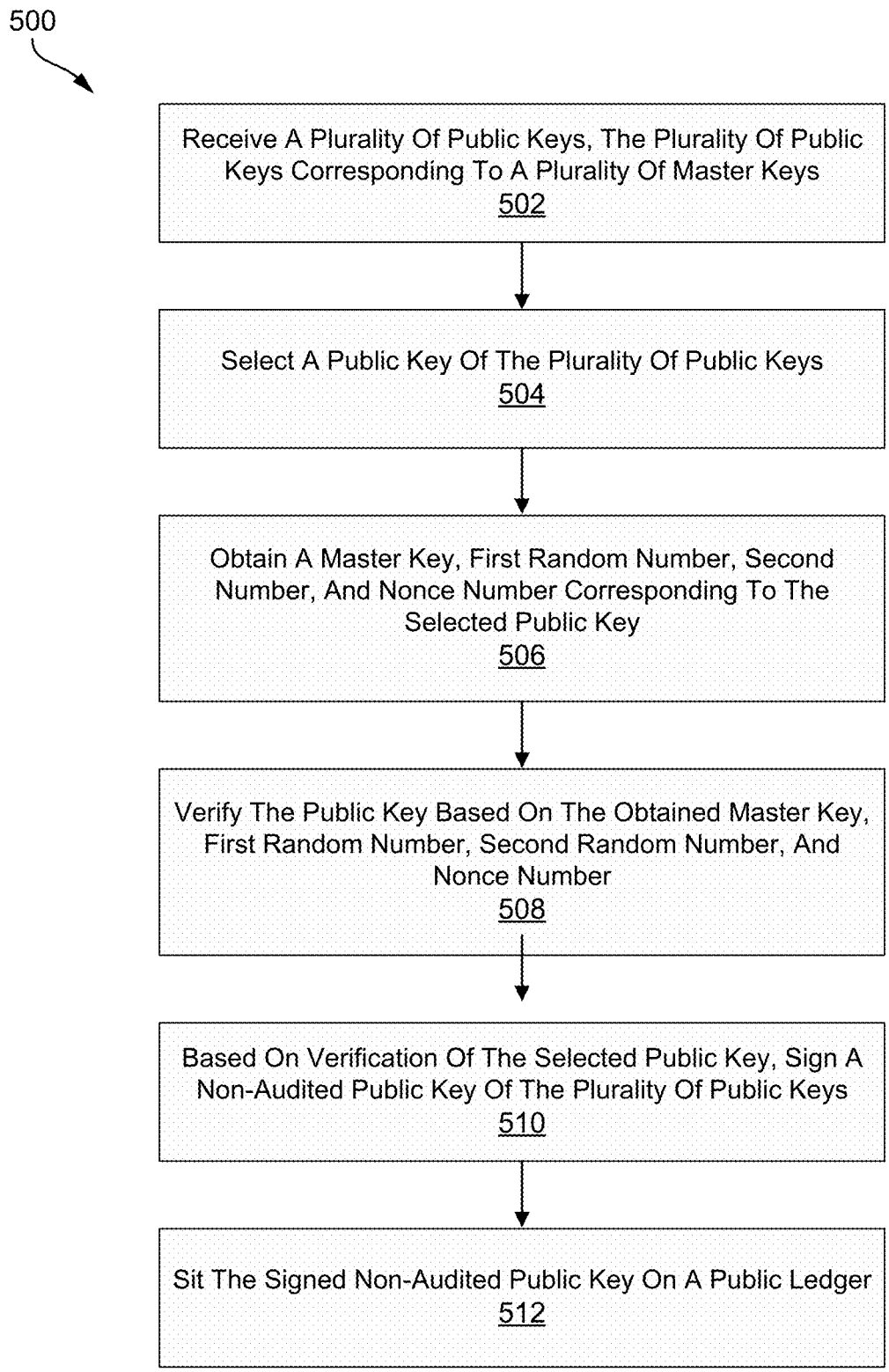
FIG. 5 is a flow diagram illustrating an example of a process for generating cryptographic numbers, in accordance with aspects of the present disclosure.

FIG. 5 is a flow diagram illustrating an example of a process 500 for generating cryptographic numbers, in accordance with aspects of the present disclosure. The process 500 may be performed by a device or by a component (e.g., SoC 100 of FIG. 1, SoC 200 of FIG. 2, processor 202 of FIG. 2, root of trust 206 of FIG. 2, processor 610 of FIG. 6, etc.) or system (e.g., a chipset) of the device (e.g., OEM device 316 of FIG. 3, computing system 600, etc.). The electronic device may be a wireless or wired device, such as computing system 600 (e.g., a mobile device such as a mobile phone, a network device, such as one or more servers,) or other type of network node. In some examples, the process 500 may be performed by a UE. The operations of the process 500 may be implemented, in part, as software components that are executed and run on one or more processors (e.g., CPU 102 of FIG. 1, processor 202 of FIG. 2, processor 610 of FIG. 6, or other processor(s)).

At block 502, the computing device (or component thereof) may receive a plurality of public keys (e.g., from a device being audited, such as processor 202 of FIG. 2), the plurality of public keys corresponding to a plurality of master keys.

At block 504, the computing device (or component thereof) may select a public key (e.g., public key C 332 of FIG. 3) of the plurality of public keys.

At block 506, the computing device (or component thereof) may obtain a master key, random number (e.g., random number $A_L$ 304 of FIG. 3), second number (e.g., second number $A_M$ 306), and nonce number (e.g., nonce number $A_R$ 308) corresponding to the selected public key. In some cases, the computing device (or component thereof) may receive a hash number; and compare a hash of the random number and nonce number to the hash number to verify the hash number. In some examples, the random number includes a device unique identifier. In some cases, the computing device (or component thereof) may verify the device unique identifier is included in the random number obtained for each of the selected public keys.

At block 508, the computing device (or component thereof) may verify the public key based on the obtained master key, random number, second number, and nonce number. In some examples, the computing device (or component thereof) may verify the public key by generating a check public key based on the obtained random number, second number, nonce number, and check master key; and verifying the check public key matches the public key. In some cases, the computing device (or component thereof) may generate the public key by: generating a check master key using a one-way function based on the random number, the second number, and the nonce number; and generating a check public key-private key pair based on the check master key, wherein the public key-private key pair is generated based on a Bitcoin improvement proposal 32 (BIP32) function.

At block 510, the computing device (or component thereof) may, based on verification of the selected public key, sign a non-audited public key of the plurality of public keys.

At block 512, the computing device (or component thereof) may deposit the signed non-audited public key on a public ledger (e.g., public ledger 322 of FIG. 3). In some cases, the signed non-audited public key is deposited on the public ledger at an address based on the plurality of public keys. In some examples, the signed non-audited public key is deposited on the public ledger along with production metadata. In some cases, the signed non-audited public key is deposited on the public ledger along with production metadata. In some cases, the production metadata may detail/attest to actions/events that were performed during the manufacturing and/or manufacturer auditing process.

In some examples, the processes described herein (e.g., process 500, and/or other process described herein) may be performed by a computing device or apparatus (e.g., a network node such as a UE, base station, a portion of a base station, etc.). For example, as noted above, one or more of the processes described herein (e.g., the process 500, and/or other process described herein) may be performed by a UE.

In some cases, the computing device or apparatus may include various components, such as one or more input devices, one or more output devices, one or more processors, one or more microprocessors, one or more microcomputers, one or more cameras, one or more sensors, and/or other component(s) that are configured to carry out the steps of processes described herein. In some examples, the computing device may include a display, one or more network interfaces configured to communicate and/or receive the data, any combination thereof, and/or other component(s). The one or more network interfaces may be configured to communicate and/or receive wired and/or wireless data, including data according to the 3G, 4G, 5G, and/or other cellular standard, data according to the WiFi (802.11x) standards, data according to the Bluetooth™ standard, data according to the Internet Protocol (IP) standard, and/or other types of data.

The components of the computing device may be implemented in circuitry. For example, the components may include and/or may be implemented using electronic circuits or other electronic hardware, which may include one or more programmable electronic circuits (e.g., microprocessors, graphics processing units (GPUs), digital signal processors (DSPs), central processing units (CPUs), and/or other suitable electronic circuits), and/or may include and/or be implemented using computer software, firmware, or any combination thereof, to perform the various operations described herein.

The process 500 is illustrated as a logical flow diagram, the operation of which represent a sequence of operations that may be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations may be combined in any order and/or in parallel to implement the processes.

Additionally, process 500 and/or other process described herein may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

Figure 6:
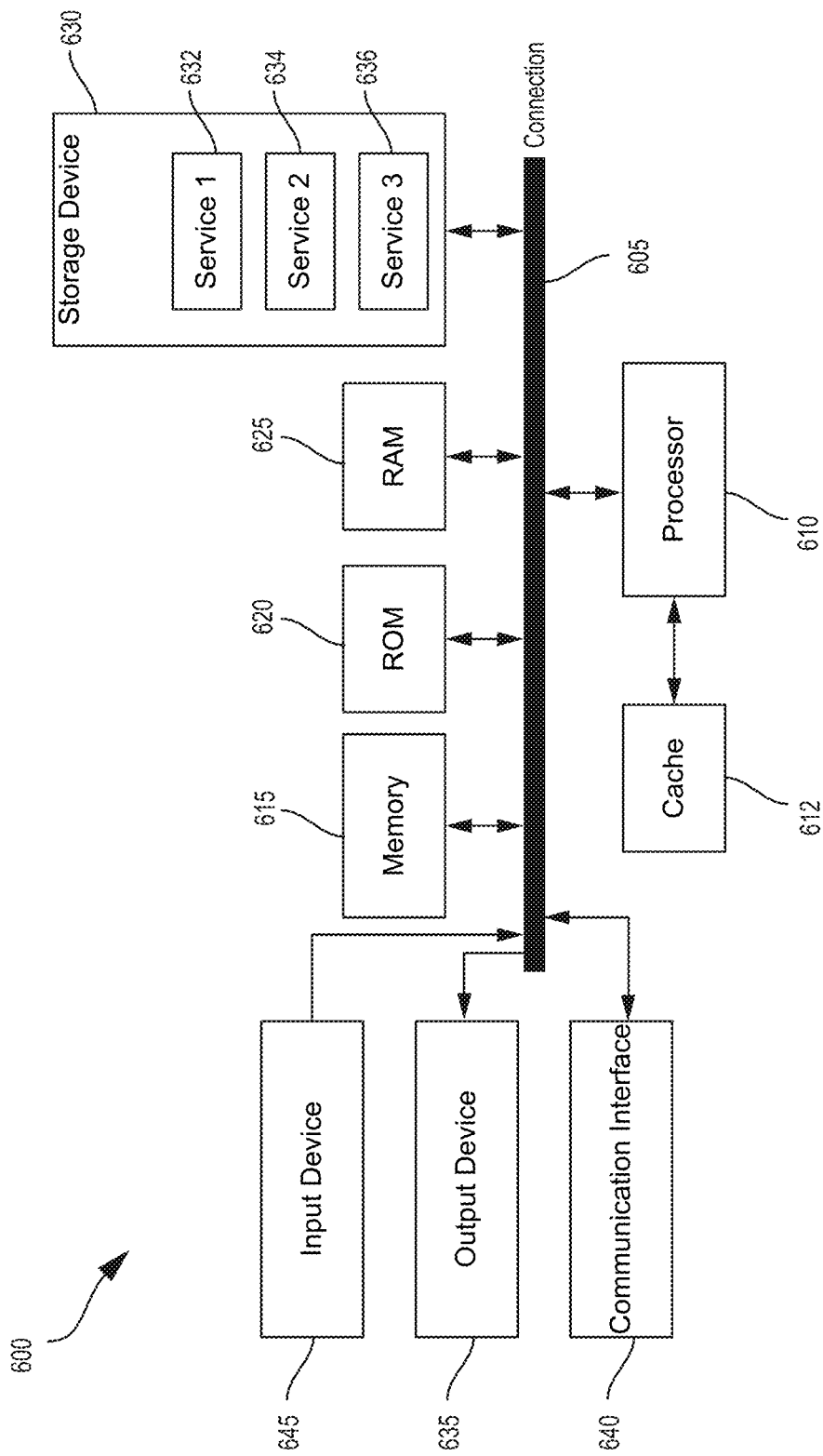
FIG. 6 is a block diagram illustrating an example of a computing system, in accordance with some examples.

FIG. 6 is a diagram illustrating an example of a system for implementing certain aspects of the present technology. In particular, FIG. 6 illustrates an example of computing system 600, which may be for example any computing device making up internal computing system, a remote computing system, a camera, or any component thereof in which the components of the system are in communication with each other using connection 605. Connection 605 may be a physical connection using a bus, or a direct connection into processor 610, such as in a chipset architecture. Connection 605 may also be a virtual connection, networked connection, or logical connection.

In some aspects, computing system 600 is a distributed system in which the functions described in this disclosure may be distributed within a datacenter, multiple data centers, a peer network, etc. In some aspects, one or more of the described system components represents many such components each performing some or all of the function for which the component is described. In some aspects, the components may be physical or virtual devices.

Example computing system 600 includes at least one processing unit (CPU or processor) 610 and connection 605 that communicatively couples various system components including system memory 625, such as read-only memory (ROM) 620 and random access memory (RAM) 625 to processor 610. Computing system 600 may include a cache 612 of high-speed memory connected directly with, in close proximity to, or integrated as part of processor 610.

Processor 610 may include any general-purpose processor and a hardware service or software service, such as services 632, 634, and 636 stored in storage device 630, configured to control processor 610 as well as a special-purpose processor where software instructions are incorporated into the actual processor design. Processor 610 may essentially be a completely self-contained computing system, containing multiple cores or processors, a bus, memory controller, cache, etc. A multi-core processor may be symmetric or asymmetric.

To enable user interaction, computing system 600 includes an input device 645, which may represent any number of input mechanisms, such as a microphone for speech, a touch-sensitive screen for gesture or graphical input, keyboard, mouse, motion input, speech, etc. Computing system 600 may also include output device 635, which may be one or more of a number of output mechanisms. In some instances, multimodal systems may enable a user to provide multiple types of input/output to communicate with computing system 600.

Computing system 600 may include communications interface 640, which may generally govern and manage the user input and system output. The communication interface may perform or facilitate receipt and/or transmission wired or wireless communications using wired and/or wireless transceivers, including those making use of an audio jack/plug, a microphone jack/plug, a universal serial bus (USB) port/plug, an Apple™ Lightning™ port/plug, an Ethernet port/plug, a fiber optic port/plug, a proprietary wired port/plug, 3G, 4G, 5G and/or other cellular data network wireless signal transfer, a Bluetooth™ wireless signal transfer, a Bluetooth™ low energy (BLE) wireless signal transfer, an IBEACON™ wireless signal transfer, a radio-frequency identification (RFID) wireless signal transfer, near-field communications (NFC) wireless signal transfer, dedicated short range communication (DSRC) wireless signal transfer, 802.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN)

signal transfer, Integrated Services Digital Network (ISDN) signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof. The communications interface 640 may also include one or more Global Navigation Satellite System (GNSS) receivers or transceivers that are used to determine a location of the computing system 600 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 630 may be a non-volatile and/or non-transitory and/or computer-readable memory device and may be a hard disk or other types of computer readable media which may store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (e.g., Level 1 (L1) cache, Level 2 (L2) cache, Level 3 (L3) cache, Level 4 (L4) cache, Level 5 (L5) cache, or other (L #) cache), resistive random-access memory (RRAM/Re-RAM), phase change memory (PCM), spin transfer torque RAM (STT-RAM), another memory chip or cartridge, and/or a combination thereof.

The storage device 630 may include software services, servers, services, etc., that when the code that defines such software is executed by the processor 610, it causes the system to perform a function. In some aspects, a hardware service that performs a particular function may include the software component stored in a computer-readable medium in connection with the necessary hardware components, such as processor 610, connection 605, output device 635, etc., to carry out the function. The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data may be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc., may be passed, forwarded, or transmitted via any suitable means including memory sharing, message passing, token passing, network transmission, or the like.

Specific details are provided in the description above to provide a thorough understanding of the aspects and examples provided herein, but those skilled in the art will recognize that the application is not limited thereto. Thus, while illustrative aspects of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, aspects may be utilized in any number of environments and applications beyond those described herein without departing from the broader scope of the specification. The specification and drawings are, accordingly, to be regarded as illustrative rather than restrictive. For the purposes of illustration, methods were described in a particular order. It should be appreciated that in alternate aspects, the methods may be performed in a different order than that described.

For clarity of explanation, in some instances the present technology may be presented as including individual functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the aspects in unnecessary detail. In other instances, well-known circuits, processes, algorithms, structures, and techniques may be shown without unnecessary detail in order to avoid obscuring the aspects.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

Individual aspects may be described above as a process or method which is depicted as a flowchart, a flow diagram, a data flow diagram, a structure diagram, or a block diagram.

Although a flowchart may describe the operations as a sequential process, many of the operations may be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination may correspond to a return of the function to the calling function or the main function.

Processes and methods according to the above-described examples may be implemented using computer-executable instructions that are stored or otherwise available from computer-readable media. Such instructions may include, for example, instructions and data which cause or otherwise configure a general purpose computer, special purpose computer, or a processing device to perform a certain function or group of functions. Portions of computer resources used may be accessible over a network. The computer executable instructions may be, for example, binaries, intermediate format instructions such as assembly language, firmware, source code. Examples of computer-readable media that may be used to store instructions, information used, and/or information created during methods according to described examples include magnetic or optical disks, flash memory, USB devices provided with non-volatile memory, networked storage devices, and so on.

In some aspects the computer-readable storage devices, mediums, and memories may include a cable or wireless signal containing a bitstream and the like. However, when mentioned, non-transitory computer-readable storage media expressly exclude media such as energy, carrier signals, electromagnetic waves, and signals per se.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof, in some cases depending in part on the particular application, in part on the desired design, in part on the corresponding technology, etc.

The various illustrative logical blocks, modules, and circuits described in connection with the aspects disclosed herein may be implemented or performed using hardware, software, firmware, middleware, microcode, hardware description languages, or any combination thereof, and may take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Examples of form factors include laptops, smart phones, mobile phones, tablet devices or other small form factor personal computers, personal digital assistants, rackmount devices, standalone devices, and so on. Functionality described herein also may be embodied in peripherals or add-in cards. Such functionality may also be implemented on a circuit board among different chips or different processes executing in a single device, by way of further example.

The instructions, media for conveying such instructions, computing resources for executing them, and other structures for supporting such computing resources are example means for providing the functions described in the disclosure.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices.

Any features described as modules or components may be implemented together in an integrated logic device or separately as discrete but interoperable logic devices. If implemented in software, the techniques may be realized at least in part by a computer-readable data storage medium comprising program code including instructions that, when executed by one or more processors, performs one or more of the methods, algorithms, and/or operations described above. The computer-readable data storage medium may form part of a computer program product, which may include packaging materials. The computer-readable medium and/or memory system may comprise any memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, memory 615, read-only memory (ROM) 620, random access memory (RAM) 625, storage device 630, and the like, and the computer-readable medium may include multiple memories or data storage media. The techniques additionally, or alternatively, may be realized at least in part by a computer-readable communication medium that carries or communicates program code in the form of instructions or data structures and that may be accessed, read, and/or executed by a computer, such as propagated signals or waves.

The program code may be executed by a processor system, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor system may be configured to perform any of the techniques described in this disclosure. A general-purpose processor may be a microprocessor; but in the alternative, the processor may be any conventional processor, controller, microcontroller, or state machine. A processor system may also be implemented as a combination of computing devices, e.g., a combination of a DSP and a microprocessor, a plurality of microprocessors, one or more microprocessors in conjunction with a DSP core, or any other such configuration. Accordingly, the term "processor system," as used herein may refer to any of the foregoing structure, any combination of the foregoing structure, or any other structure or apparatus suitable for implementation of the techniques described herein.

One of ordinary skill will appreciate that the less than ("<") and greater than (">") symbols or terminology used herein may be replaced with less than or equal to ("≤") and greater than or equal to ("≥") symbols, respectively, without departing from the scope of this description.

Where components are described as being "configured to" perform certain operations, such configuration may be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" or "communicatively coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, A and B and C, or any duplicate information or data (e.g., A and A, B and B, C and C, A and A and B, and so on), or any other ordering, duplication, or combination of A, B, and C. The language "at least one of" a set and/or "one or more" of a set does not limit the set to the items listed in the set. For example, claim language reciting "at least one of A and B" or "at least one of A or B" may mean A, B, or A and B, and may additionally include items not listed in the set of A and B. The phrases "at least one" and "one or more" are used interchangeably herein.

Claim language or other language reciting "at least one processor configured to," "at least one processor being configured to," "one or more processors configured to," "one or more processors being configured to," or the like indicates that one processor or multiple processors (in any combination) can perform the associated operation(s). For example, claim language reciting "at least one processor configured to: X, Y, and Z" means a single processor can be used to perform operations X, Y, and Z; or that multiple processors are each tasked with a certain subset of operations X, Y, and Z such that together the multiple processors perform X, Y, and Z; or that a group of multiple processors work together to perform operations X, Y, and Z. In another example, claim language reciting "at least one processor configured to: X, Y, and Z" can mean that any single processor may only perform at least a subset of operations X, Y, and Z.

Where reference is made to one or more elements performing functions (e.g., steps of a method), one element may perform all functions, or more than one element may collectively perform the functions. When more than one element collectively performs the functions, each function need not be performed by each of those elements (e.g., different functions may be performed by different elements) and/or each function need not be performed in whole by only one element (e.g., different elements may perform different sub-functions of a function). Similarly, where reference is made to one or more elements configured to cause another element (e.g., an apparatus) to perform functions, one element may be configured to cause the other element to perform all functions, or more than one element may collectively be configured to cause the other element to perform the functions.

Where reference is made to an entity (e.g., any entity or device described herein) performing functions or being configured to perform functions (e.g., steps of a method), the entity may be configured to cause one or more elements (individually or collectively) to perform the functions. The one or more components of the entity may include at least one memory, at least one processor, at least one communication interface, another component configured to perform one or more (or all) of the functions, and/or any combination thereof. Where reference to the entity performing functions, the entity may be configured to cause one component to perform all functions, or to cause more than one component to collectively perform the functions. When the entity is configured to cause more than one component to collectively perform the functions, each function need not be performed by each of those components (e.g., different functions may be performed by different components) and/or each function need not be performed in whole by only one component (e.g., different components may perform different sub-functions of a function).

Illustrative aspects of the disclosure include:

Aspect 1. An apparatus for generating cryptographic keys, comprising: a one-time programmable memory; a memory system comprising instructions; and a processor system coupled to the memory system and the one-time programmable memory, wherein the processor system is configured to: generate a plurality of master keys using a one-way function based on a plurality of generated random numbers, a second number, and a nonce number; store a master key, of the plurality of master keys, along with a generated random number of the plurality of generated random numbers, the second number, and the nonce number used to generate the master key in the one-time programmable memory; generate a plurality of public key-private key pairs for the plurality of master keys; transmit public keys of the plurality of public key-private key pairs for an audit; destroy an audited master key of the plurality of master keys, along with the generated random number, second number, and the nonce number used to generate the audited master key, based on the audit; and store a non-audited public key-private key pair corresponding to the master key that were not destroyed based on the audit.

Aspect 2. The apparatus of Aspect 1, wherein a public key of the non-audited public key-private key pair is deposited on a public ledger.

Aspect 3. The apparatus of Aspect 2, wherein the public key of the non-audited public key-private key pair is deposited on a public ledger at an address based on the public key.

Aspect 4. The apparatus of any of Aspects 1-3, wherein a public key of the non-audited public key-private key pair is signed by a manufacturer, designer, or original equipment manufacturer.

Aspect 5. The apparatus of any of Aspects 1-4, wherein the processor system is further configured to receive the second number and nonce number during a manufacturing process, wherein the second number comprises a number obtained from a public source.

Aspect 6. The apparatus of any of Aspects 1-5, wherein each master key of the plurality of master keys is generated based on a unique generated random number.

Aspect 7. The apparatus of Aspect 6, wherein each master key of the plurality of master keys is generated based on a unique second number and a unique nonce number.

Aspect 8. The apparatus of any of Aspects 1-7, wherein the processor system is further configured to: store the generated random number, second number, and nonce number used to generate the audited master key, and the audited master key in the one-time programmable memory; receive an indication that a public key generated based on the audited master key of the plurality of public key-private key pairs is being audited; provide the generated random number, second number, and nonce number used to generate the audited master key, and the audited master key associated with the public key; and destroy the generated random number, second number, and nonce number used to generate the audited master key, and the audited master key associated with the public key stored in the one-time programmable memory.

Aspect 9. The apparatus of Aspect 8, wherein, to destroy the generated random number, second number, and nonce number, and master key, the processor system is configured to write at least one bit for each portion of the one-time programmable memory storing the generated random number, second number, and nonce number, and master key.

Aspect 10. The apparatus of any of Aspects 1-9, wherein the plurality of public key-private key pairs are generated based on a Bitcoin improvement proposal 32 (BIP32) function.

Aspect 11. The apparatus of any of Aspects 1-10, wherein a representative sample of the plurality of master keys are audited.

Aspect 12. The apparatus of any of Aspects 1-11, wherein the processor system is further configured to: generate a hash number based on the generated random number and the nonce number; and provide the hash number to a manufacturer, designer, or original equipment manufacturer.

Aspect 13. The apparatus of any of Aspects 1-12, wherein the random number includes a device unique identifier.

Aspect 14. An apparatus for auditing cryptographic numbers comprising: a memory system comprising instructions; and a processor system coupled to the memory system, wherein the processor system is configured to: receive a plurality of public keys, the plurality of public keys corresponding to a plurality of master keys; select a public key of the plurality of public keys; obtain a master key, random number, second number, and nonce number corresponding to the selected public key; verify the public key based on the obtained master key, random number, second number, and nonce number; based on verification of the selected public key, sign a non-audited public key of the plurality of public keys; and deposit the signed non-audited public key on a public ledger.

Aspect 15. The apparatus of Aspect 14, wherein the signed non-audited public key is deposited on the public ledger at an address based on the plurality of public keys.

Aspect 16. The apparatus of any of Aspects 14-15, wherein the signed non-audited public key is deposited on the public ledger along with production metadata.

Aspect 17. The apparatus of any of Aspects 14-16, wherein, to verify the public key, the processor system is configured to: generate a check public key based on the obtained random number, second number, nonce number, and check master key; and verify the check public key matches the public key.

Aspect 18. The apparatus of Aspect 17, wherein, to generate the public key, the processor system is configured to: generate a check master key using a one-way function based on the random number, the second number, and the nonce number; and generate a check public key-private key pair based on the check master key, wherein the public key-private key pair is generated based on a Bitcoin improvement proposal 32 (BIP32) function.

Aspect 19. The apparatus of any of Aspects 14-18, wherein the processor system is further configured to: receive a hash number; and compare a hash of the random number and nonce number to the hash number to verify the hash number.

Aspect 20. The apparatus of any of Aspects 14-19, wherein the random number includes a device unique identifier.

Aspect 21. The apparatus of Aspect 20, wherein the processor system is further configured to verify the device unique identifier is included in the random number obtained for each of the selected public keys.

Aspect 22. A method for generating cryptographic keys, comprising: generating a plurality of master keys using a one-way function based on a plurality of generated random numbers, a second number, and a nonce number; storing a master key, of the plurality of master keys, along with a generated random number of the plurality of generated random numbers, the second number, and the nonce number used to generate the master key in a one-time programmable memory; generating a plurality of public key-private key pairs for the plurality of master keys; transmitting public keys of the plurality of public key-private key pairs for an audit; destroying an audited master key of the plurality of master keys, along with the generated random number, second number, and the nonce number used to generate the audited master key, based on the audit; and storing a non-audited public key-private key pair corresponding to the master key that were not destroyed based on the audit.

Aspect 23. The method of Aspect 22, wherein a public key of the non-audited public key-private key pair is deposited on a public ledger.

Aspect 24. The method of Aspect 23, wherein the public key of the non-audited public key-private key pair is deposited on a public ledger at an address based on the public key.

Aspect 25. The method of any of Aspects 22-24, wherein a public key of the non-audited public key-private key pair is signed by a manufacturer, designer, or original equipment manufacturer.

Aspect 26. The method of any of Aspects 22-25, further comprising receiving the second number and nonce number during a manufacturing process, wherein the second number comprises a number obtained from a public source.

Aspect 27. The method of any of Aspects 22-26, wherein each master key of the plurality of master keys is generated based on a unique generated random number.

Aspect 28. The method of Aspect 27, wherein each master key of the plurality of master keys is generated based on a unique second number and a unique nonce number.

Aspect 29. The method of any of Aspects 22-28, further comprising: storing the generated random number, second number, and nonce number used to generate the audited master key, and the audited master key in the one-time programmable memory; receiving an indication that a public key generated based on the audited master key of the plurality of public key-private key pairs is being audited; providing the generated random number, second number, and nonce number used to generate the audited master key, and the audited master key associated with the public key; and destroying the generated random number, second number, and nonce number used to generate the audited master key, and the audited master key associated with the public key stored in the one-time programmable memory.

Aspect 30. The method of Aspect 29, wherein destroying the generated random number, second number, and nonce number, and master key comprises writing at least one bit for each portion of the one-time programmable memory storing the generated random number, second number, and nonce number, and master key.

Aspect 31. The method of any of Aspects 22-30, wherein the plurality of public key-private key pairs are generated based on a Bitcoin improvement proposal 32 (BIP32) function.

Aspect 32. The method of any of Aspects 22-31, wherein a representative sample of the plurality of master keys are audited.

Aspect 33. The method of any of Aspects 22-32, further comprising: generating a hash number based on the generated random number and the nonce number; and providing the hash number to a manufacturer, designer, or original equipment manufacturer.

Aspect 34. The method of any of Aspects 22-33, wherein the random number includes a device unique identifier.

Aspect 35. A method for auditing cryptographic numbers comprising: receiving a plurality of public keys, the plurality of public keys corresponding to a plurality of master keys; selecting a public key of the plurality of public keys; obtaining a master key, random number, second number, and nonce number corresponding to the selected public key; verifying the public key based on the obtained master key, random number, second number, and nonce number; based on verification of the selected public key, signing a non-audited public key of the plurality of public keys; and depositing the signed non-audited public key on a public ledger.

Aspect 36. The method of Aspect 35, wherein the signed non-audited public key is deposited on the public ledger at an address based on the plurality of public keys.

Aspect 37. The method of any of Aspects 35-26, wherein the signed non-audited public key is deposited on the public ledger along with production metadata.

Aspect 38. The method of any of Aspects 35-37, wherein verifying the public key comprises: generating a check public key based on the obtained random number, second number, nonce number, and check master key; and verifying the check public key matches the public key.

Aspect 39. The method of Aspect 38, wherein generating the public key comprises: generating a check master key using a one-way function based on the random number, the second number, and the nonce number; and generating a check public key-private key pair based on the check master key, wherein the public key-private key pair is generated based on a Bitcoin improvement proposal 32 (BIP32) function.

Aspect 40. The method of any of Aspects 35-39, further comprising: receiving a hash number; and comparing a hash of the random number and nonce number to the hash number to verify the hash number.

Aspect 41. The method of any of Aspects 35-40, wherein the random number includes a device unique identifier.

Aspect 42. The method of Aspect 41, further comprising: verifying the device unique identifier is included in the random number obtained for each of the selected public keys.

Aspect 43. A non-transitory computer-readable storage medium having stored thereon instructions that, when executed by one or more processors, cause the one or more processors to perform operations according to any one or more of Aspects 22-34.

Aspect 44. A non-transitory computer-readable storage medium having stored thereon instructions that, when executed by one or more processors, cause the one or more processors to perform operations according to any one or more of Aspects 35-42.

Aspect 45. An apparatus for wireless communications, comprising one or more means for performing operations according to any of Aspects 22 to 34.

Aspect 46. An apparatus for wireless communications, comprising one or more means for performing operations according to any of Aspects 35 to 42.

Aspect 47. The method of Aspect 22, further comprising: detecting an attempt to access a beginning private key to sign an arbitrary data; and denying access to the beginning private key.

What is claimed is:

1. An apparatus for generating cryptographic keys, comprising:
a one-time programmable memory;
a memory system comprising instructions; and
a processor system coupled to the memory system and the one-time programmable memory, wherein the processor system is configured to:
generate a plurality of master keys using a one-way function based on a plurality of generated random numbers, a second number, and a nonce number;
store a master key, of the plurality of master keys, along with a generated random number of the plurality of generated random numbers, the second number, and the nonce number used to generate the master key in the one-time programmable memory;
generate a plurality of public key-private key pairs for the plurality of master keys;
transmit public keys of the plurality of public key-private key pairs for an audit;
destroy an audited master key of the plurality of master keys, along with the generated random number, second number, and the nonce number used to generate the audited master key, based on the audit; and
store a non-audited public key-private key pair corresponding to the master key that were not destroyed based on the audit.

2. The apparatus of claim 1, wherein a public key of the non-audited public key-private key pair is deposited on a public ledger.

3. The apparatus of claim 2, wherein the public key of the non-audited public key-private key pair is deposited on a public ledger at an address based on the public key.

4. The apparatus of claim 1, wherein a public key of the non-audited public key-private key pair is signed by a manufacturer, designer, or original equipment manufacturer.

5. The apparatus of claim 1, wherein the processor system is further configured to receive the second number and nonce number during a manufacturing process, wherein the second number comprises a number obtained from a public source.

6. The apparatus of claim 1, wherein each master key of the plurality of master keys is generated based on a unique generated random number.

7. The apparatus of claim 6, wherein each master key of the plurality of master keys is generated based on a unique second number and a unique nonce number.

8. The apparatus of claim 1, wherein the processor system is further configured to:
store the generated random number, second number, and nonce number used to generate the audited master key, and the audited master key in the one-time programmable memory;
receive an indication that a public key generated based on the audited master key of the plurality of public key-private key pairs is being audited;
provide the generated random number, second number, and nonce number used to generate the audited master key, and the audited master key associated with the public key; and
destroy the generated random number, second number, and nonce number used to generate the audited master key, and the audited master key associated with the public key stored in the one-time programmable memory.

9. The apparatus of claim 8, wherein, to destroy the generated random number, second number, and nonce number, and master key, the processor system is configured to write at least one bit for each portion of the one-time programmable memory storing the generated random number, second number, and nonce number, and master key.

10. The apparatus of claim 1, wherein the plurality of public key-private key pairs are generated based on a Bitcoin improvement proposal 32 (BIP32) function.

11. The apparatus of claim 1, wherein a representative sample of the plurality of master keys are audited.

12. The apparatus of claim 1, wherein the processor system is further configured to:
generate a hash number based on the generated random number and the nonce number; and
provide the hash number to a manufacturer, designer, or original equipment manufacturer.

13. The apparatus of claim 1, wherein the generated random number includes a device unique identifier.

14. A method of generating cryptographic keys, the method comprising:
generating a plurality of master keys using a one-way function based on a plurality of generated random numbers, a second number, and a nonce number;
storing a master key, of the plurality of master keys, along with a generated random number of the plurality of generated random numbers, the second number, and the nonce number used to generate the master key in a one-time programmable memory;
generating a plurality of public key-private key pairs for the plurality of master keys;
transmitting public keys of the plurality of public key-private key pairs for an audit;
destroying an audited master key of the plurality of master keys, along with the generated random number, second number, and the nonce number used to generate the audited master key, based on the audit; and
storing a non-audited public key-private key pair corresponding to the master key that were not destroyed based on the audit.

15. The method of claim 14, wherein a public key of the non-audited public key-private key pair is deposited on a public ledger.

16. The method of claim 15, wherein the public key of the non-audited public key-private key pair is deposited on a public ledger at an address based on the public key.

17. The method of claim 14, wherein a public key of the non-audited public key-private key pair is signed by a manufacturer, designer, or original equipment manufacturer.

18. The method of claim 14, further comprising receiving the second number and nonce number during a manufacturing process, wherein the second number comprises a number obtained from a public source.

19. The method of claim 14, wherein each master key of the plurality of master keys is generated based on a unique generated random number.

* * * * *